(12) United States Patent
Weber et al.

(10) Patent No.: US 8,733,110 B2
(45) Date of Patent: May 27, 2014

(54) METHOD AND SYSTEMS FOR BLEED AIR SUPPLY

(75) Inventors: Kent Weber, Loves Park, IL (US); Athanasios Kyriazopoulos, Roscoe, IL (US); Peter C. Hightower, Belvidere, IL (US); Bradley J. Burie, Rockton, IL (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 191 days.

(21) Appl. No.: 13/585,417

(22) Filed: Aug. 14, 2012

(65) Prior Publication Data
US 2012/0304663 A1 Dec. 6, 2012

Related U.S. Application Data

(62) Division of application No. 12/495,366, filed on Jun. 30, 2009, now Pat. No. 8,267,122.

(51) Int. Cl.
*F02C 6/08* (2006.01)
(52) U.S. Cl.
USPC ............................................. 60/782; 60/785
(58) Field of Classification Search
USPC .................................. 60/782, 785, 795, 806
See application file for complete search history.

(56) References Cited

U.S. PATENT DOCUMENTS

| | | | |
|---|---|---|---|
| 1,180,017 A | 4/1916 | Davenport | |
| 1,421,843 A | 7/1922 | Schmidt | |
| 2,959,188 A | 11/1960 | Kepner | |
| 3,367,255 A | 2/1968 | Terp | |
| 3,441,045 A | 4/1969 | Malone | |
| 3,909,152 A | 9/1975 | Rannenberg | |
| 3,924,651 A | 12/1975 | Hippel et al. | |
| 4,380,893 A | 4/1983 | Stokes et al. | |
| 4,631,004 A | 12/1986 | Mock | |
| 4,671,318 A | 6/1987 | Benson | |
| 5,063,963 A | 11/1991 | Smith | |
| 5,136,837 A | 8/1992 | Davison | |
| 5,137,230 A | 8/1992 | Coffinberry | |

(Continued)

FOREIGN PATENT DOCUMENTS

| CN | 1257572 A | 6/2000 |
|---|---|---|
| CN | 101418724 A | 4/2009 |

(Continued)

OTHER PUBLICATIONS

PCT International Search Report and Written Opinion for corresponding PCT patent application No. PCT/US2010/034759 dated Jun. 8, 2011.

(Continued)

*Primary Examiner* — William H Rodriguez
(74) *Attorney, Agent, or Firm* — Matthew P. Hayden; Armstrong Teasdale LLP

(57) ABSTRACT

A method and system for an integrated ejector valve assembly is provided. The integrated ejector valve assembly includes a first valve assembly configured to control a flow of relatively lower pressure fluid from a first inlet port, a second valve assembly configured to control a flow of relatively higher pressure fluid from a second inlet port, a first actuation chamber configured to close the first valve assembly, a second actuation chamber configured to close the second valve assembly, and a third actuation chamber configured to open the second valve assembly.

11 Claims, 3 Drawing Sheets

(56) References Cited

U.S. PATENT DOCUMENTS

| | | | |
|---|---|---|---|
| 5,139,225 A | 8/1992 | Olson et al. | |
| 6,305,156 B1 | 10/2001 | Lui | |
| 6,412,270 B1* | 7/2002 | Mortzheim et al. | 60/782 |
| 6,550,253 B2* | 4/2003 | Mortzheim et al. | 60/782 |
| 6,615,574 B1* | 9/2003 | Marks | 60/772 |
| 6,701,715 B2* | 3/2004 | Anderson et al. | 60/782 |
| 6,782,703 B2* | 8/2004 | Dovali-Solis | 60/785 |
| 6,858,340 B2 | 2/2005 | Sugawara et al. | |
| 7,698,898 B2* | 4/2010 | Eluripati et al. | 60/785 |
| 8,057,157 B2* | 11/2011 | Roush et al. | 415/1 |
| 8,136,361 B2* | 3/2012 | Schott et al. | 60/782 |
| 8,240,153 B2* | 8/2012 | Childers et al. | 60/782 |
| 2008/0115503 A1* | 5/2008 | Vasquez et al. | 60/785 |
| 2009/0104020 A1 | 4/2009 | Roush et al. | |
| 2010/0040482 A1* | 2/2010 | Whaling et al. | 417/198 |
| 2011/0067413 A1* | 3/2011 | Alecu et al. | 60/782 |
| 2011/0072827 A1* | 3/2011 | Ciofini et al. | 60/772 |
| 2011/0162386 A1* | 7/2011 | Chandrabose et al. | 60/785 |

FOREIGN PATENT DOCUMENTS

| | | |
|---|---|---|
| EP | 1923575 A2 | 5/2008 |
| WO | 9823484 A1 | 6/1998 |
| WO | 9844300 A1 | 10/1998 |

OTHER PUBLICATIONS

Unofficial English translation of search report from CN Application No. 201080030248.2 dated Jul. 15, 2013.

* cited by examiner

METHOD AND SYSTEMS FOR BLEED AIR SUPPLY

CROSS REFERENCE TO RELATED APPLICATIONS

This application is a division of application Ser. No. 12/495,366, filed Jun. 30, 2009 now U.S. Pat. No. 8,267,122, which is hereby incorporated by reference in its entirety.

BACKGROUND OF THE INVENTION

The field of the invention relates generally to bleed air systems, and more specifically, to a method and systems for an integrated ejector valve assembly for supplying bleed air to an aircraft.

At least some known aircraft use engine bleed air for cabin pressurization, anti-ice and other functions on the aircraft. The bleed air pressure must be reduced under most operating conditions to provide a regulated air supply. Engine bleed air pressures vary greatly with engine speed and operating altitude. Engines typically have two bleed extraction ports, a low pressure (LP) port which is used whenever possible and a high pressure (HP) port which is used only at conditions of high altitude and/or low engine speed when LP bleed pressure is insufficient to supply the needs of the aircraft.

An ejector can often be beneficial using some regulated HP bleed air to boost LP flow and extracting LP flow when the LP pressure is lower than required. A pressure regulating and shut-off valve controls the bleed air system pressure. An LP non-return valve (NRV) is usually provided to assure that there is no back flow from the HP bleed port to the LP bleed port. An HP pressure regulating and shut-off valve controls the flow of air from the HP bleed port when LP air pressure is insufficient.

A typical jet engine has two bleed air extraction ports, a low pressure (LP) bleed port and a high pressure (HP) bleed port. Engine efficiency is maximized by using LP air whenever the LP bleed port pressure is adequate. The HP bleed port is used to supply bleed air only when necessary. It is often advantageous to extract equal bleed air flows from each engine in both the LP and HP modes while controlling the bleed air system pressure.

Known bleed air systems include a pressure regulator downstream of the bleed ports that may also provide a shut-off function so they are known as pressure regulating shut-off valves (PRSOV). The LP NRV prevents backflow into the engine LP bleed port when the LP pressure is larger than required bleed system pressure. A high pressure shut-off valve (SOV) is opened when LP air pressure is insufficient. In some cases, this valve is also a pressure regulating valve (HPPRSOV).

The transition from LP to HP is typically abrupt. When the LP pressure is inadequate, the HP shut-off valve (SOV), or HPPRSOV in some cases, is opened. The higher pressure from the HP part closes an LP check valve to prevent backflow. The entire flow is then supplied by the HP bleed port. In some configurations, the LP NRV and LP check valve functions are performed by the same component.

However such systems include many components that each includes numerous parts. The individual parts must be stocked for maintenance and repair operations and the number of components adds to the weight of the aircraft, causing a loss of efficiency.

BRIEF DESCRIPTION OF THE INVENTION

In one embodiment, an integrated ejector valve assembly includes a first valve assembly configured to control a flow of relatively lower pressure fluid from a first inlet port, a second valve assembly configured to control a flow of relatively higher pressure fluid from a second inlet port, a first actuation chamber configured to close the first valve assembly, a second actuation chamber configured to close the second valve assembly, and a third actuation chamber configured to open the second valve assembly.

In another embodiment, a method of supplying engine bleed air to an aircraft using a first integrated ejector valve assembly includes controlling a flow of a relatively lower pressure fluid received at the first integrated ejector valve assembly using a first valve assembly, controlling a flow of a relatively higher pressure fluid received at the first integrated ejector valve assembly using a second valve assembly, and maintaining a pressure in an outlet of the first integrated ejector valve assembly using the controlled flow of relatively lower pressure fluid and the controlled flow of relatively higher pressure fluid.

In yet another embodiment, an aircraft system includes a first gas turbine engine including a first high pressure bleed port and a first low pressure bleed port, a second gas turbine engine including a second high pressure bleed port and a second low pressure bleed port, and an engine bleed air header configured to channel bleed air at a selectable pressure to the aircraft. The aircraft system also includes a first integrated ejector valve assembly coupled in flow communication between the first high pressure bleed port and first low pressure bleed port, and the engine bleed air header, a second integrated ejector valve assembly coupled in flow communication between the second high pressure bleed port and second low pressure bleed port, and the engine bleed air header, and a controller communicatively coupled to the first integrated ejector valve assembly and the second integrated ejector valve assembly, the controller configured to substantially match an output flow of the first integrated ejector valve assembly and the second integrated ejector valve assembly.

BRIEF DESCRIPTION OF THE DRAWINGS

FIG. 1 is a schematic block diagram of an aircraft bleed air system in accordance with an exemplary embodiment of the present invention;

FIG. 2 is a schematic block diagram of the integrated ejector valve assembly shown in FIG. 1 in accordance with an exemplary embodiment of the present invention; and FIG. 3 is an isometric cross section of the integrated ejector valve assembly shown in FIG. 1 in accordance with an exemplary embodiment of the present invention.

DETAILED DESCRIPTION OF THE INVENTION

The following detailed description illustrates embodiments of the invention by way of example and not by way of limitation. It is contemplated that the invention has general application to bleed air systems in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Figure 1:
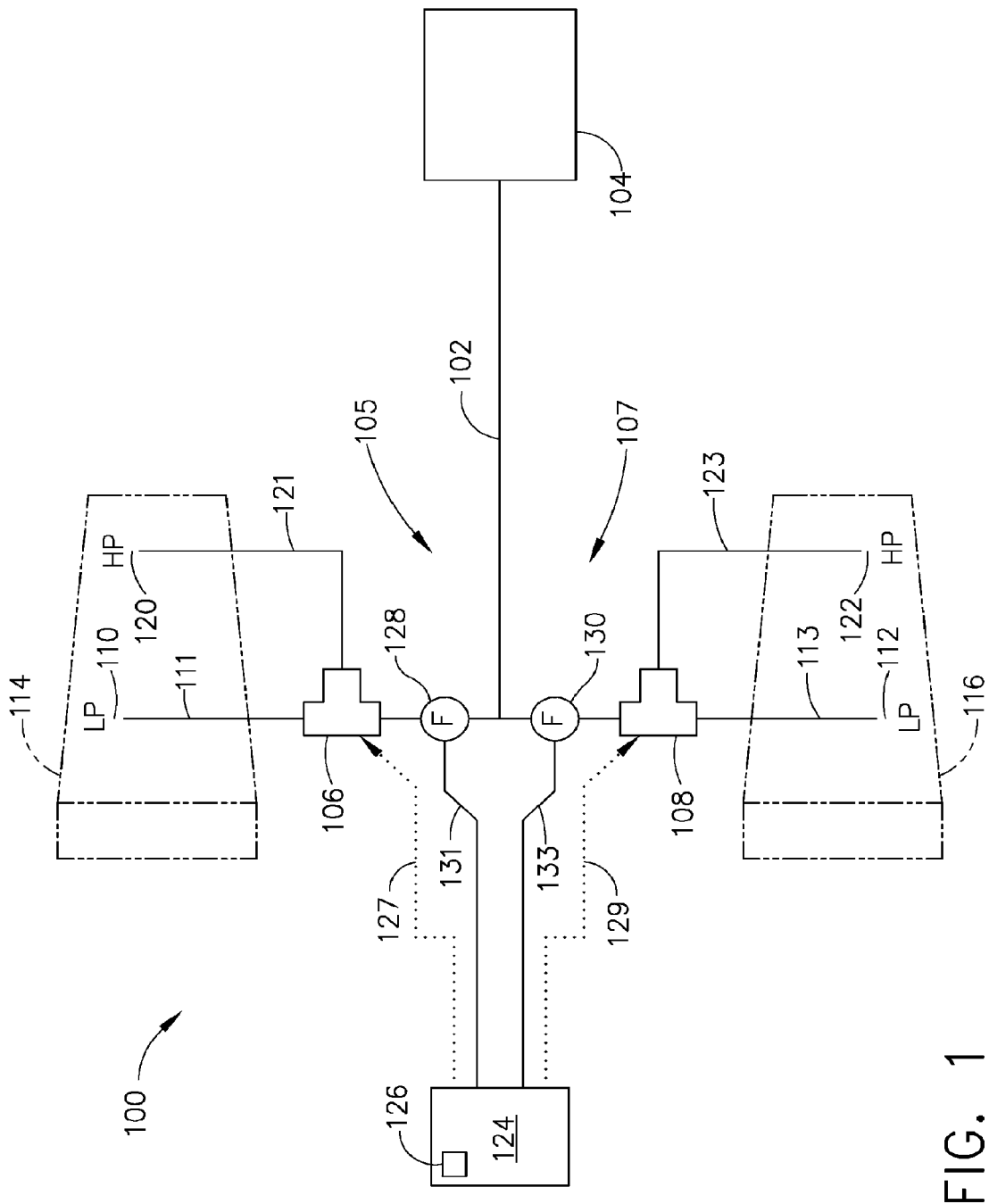
FIGS. 1-3 show exemplary embodiments of the method and systems described herein.

FIG. 1 is a schematic block diagram of an aircraft bleed air system 100 in accordance with an exemplary embodiment of the present invention. In the exemplary embodiment, aircraft bleed air system 100 includes a bleed air header 102 from which a plurality of bleed air loads 104 draw a supply of bleed air at a predetermined pressure. A pressure within bleed air header 102 is maintained within a predetermined range using one or more bleed air control circuits including integrated ejector valve assemblies. In the exemplary embodiment, aircraft bleed air system 100 includes a first bleed air control circuit 105 including a first integrated ejector valve assembly 106 and includes a second bleed air control circuit 107 including a second integrated ejector valve assembly 108. Each integrated ejector valve assembly is supplied with relatively lower pressure bleed air from a low pressure (LP) bleed port 110, 112 of an associated gas turbine engine 114, 116 through respective supply lines 111 and 113, and supplied with higher pressure bleed air from high pressure (HP) bleed ports 120 and 122 through respective supply lines 121 and 123.

The integrated ejector valve assemblies can control the downstream bleed air pressure under all operating conditions, using LP bleed air exclusively when LP pressure is sufficient and augmenting with HP flow when LP pressure is insufficient.

In one embodiment of the invention, valve elements within integrated ejector valve assemblies 106 and 108 are controlled by an electronic controller 124 that includes a processor 126. In an alternative embodiment, the valve elements are controlled using conventional pneumatic signals. Pressure to actuate the valve elements is channeled from HP bleed ports 120 and 122 and is ported to the various chambers by torque motor servo valves (not shown in FIG. 1) controlled by electronic or pneumatic controller 124 through respective signal lines 127 and 129. With this control flexibility, the valve elements can be used as flow control valves, pressure regulating valves, or as shut-off valves with no hardware changes. Integrated ejector valve assemblies 106 and 108 are also used to equalize flow between gas turbine engines 114 and 116.

In the exemplary embodiment, integrated ejector valve assemblies 106 and 108 are described as flow control valves using flow signals from downstream flow meters 128 and 130 channeled to controller 124 through respective signal lines 131 and 133, that controls the position of the valve elements, for example, but not limited to, pintle and poppet valves positioned within integrated ejector valve assemblies 106 and 108.

For illustration, assume that bleed air pressure must be maintained between 30 and 40 psig. A pressure range setting of 32±2 psig is assigned for HP operation and 38±2 psig is assigned for LP operation. Note that these pressure bands do not overlap. Whenever bleed system pressure is above the HP setpoint, the HP pintle valve will be fully closed. Whenever the pressure is below the LP setpoint, the LP poppet valve will be fully open. Whenever the pressure is above the LP setpoint the poppet valve will be fully closed to prevent backflow from HP bleed port 120 or 122 to LP bleed port 110 or 112, respectively.

Figure 2:
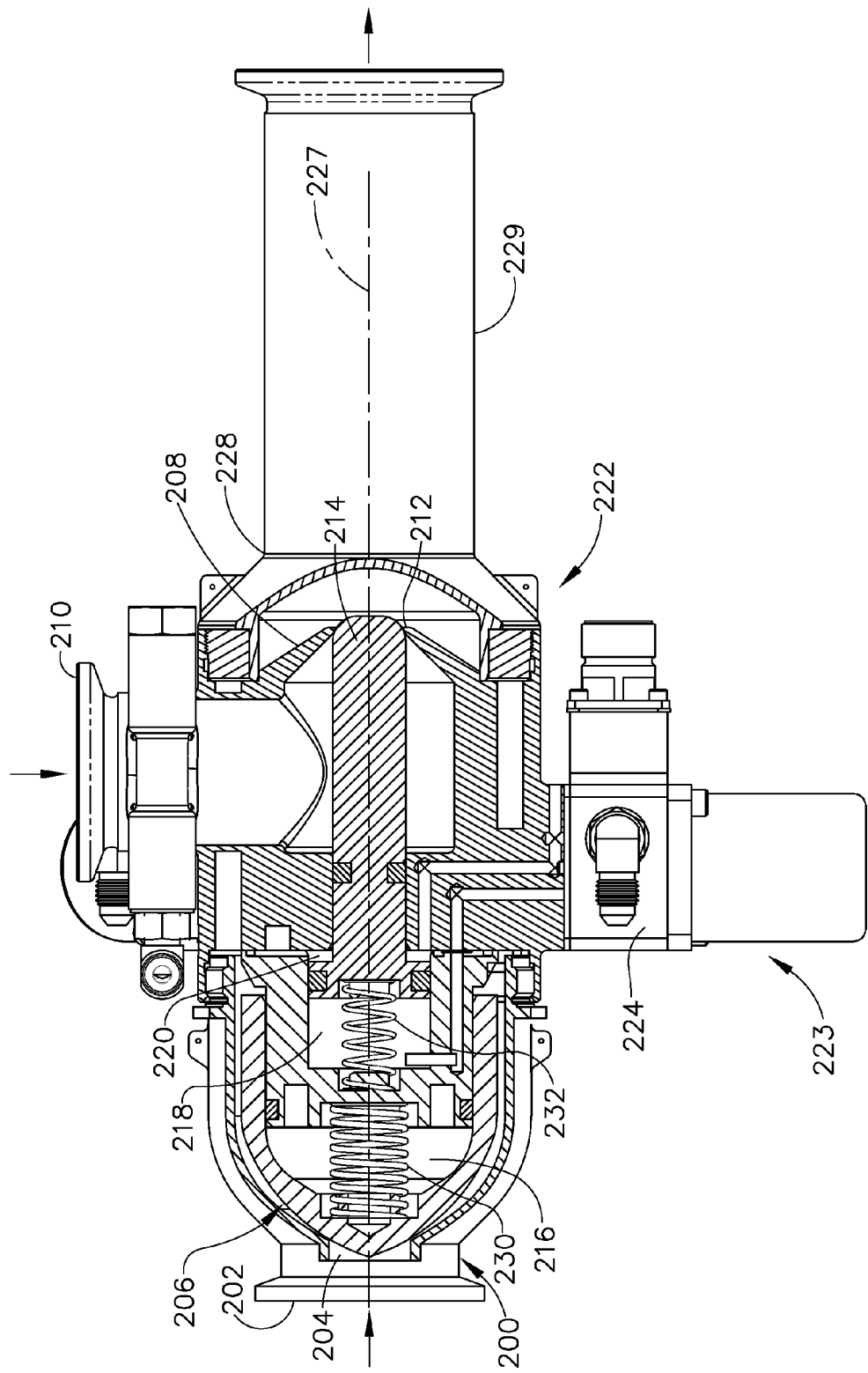

FIG. 2 is a schematic block diagram of integrated ejector valve assembly 106 or 108 (shown in FIG. 1) in accordance with an exemplary embodiment of the present invention. For ease of description, only integrated ejector valve assembly 106 is described, integrated ejector valve assembly 108 being substantially identical. In the exemplary embodiment, integrated ejector valve assembly 106 includes a first valve assembly 200 configured to control a flow of relatively lower pressure fluid from a first inlet port 202. First valve assembly 200 includes a valve seat 204 and a valve member 206, such as, but not limited to, a poppet valve. Integrated ejector valve assembly 106 further includes a second valve assembly 208 configured to control a flow of relatively higher pressure fluid from a second inlet port 210. Second valve assembly 208 includes a valve seat 212 and a valve member 214, such as, but not limited to, a pintle valve. Integrated ejector valve assembly 106 also includes a first actuation chamber 216 configured to close first valve assembly 200, a second actuation chamber 218 configured to close second valve assembly 208, and a third actuation chamber 220 configured to open second valve assembly 208. In the exemplary embodiment, integrated ejector valve assembly 106 includes an ejector 222 configured to use the flow of relatively higher pressure fluid to facilitate increasing the flow of relatively lower pressure fluid. Second valve assembly 208 acting as a throttle element controls HP flow by a pintle in the primary throat of ejector 222. Secondary LP flow is entrained by ejector 222.

A first torque motor servo valve (not shown in FIG. 2) comprising a manifold having a plurality of passages (also not shown in FIG. 2) configured to control a pressure in first actuation chamber 216. A second torque motor servo valve 223 comprising a manifold 224 having a plurality of passages 226 configured to control a differential pressure between second actuation chamber 218 and third actuation chamber 220. In the exemplary embodiment, first valve assembly 200 is configured to maintain a pressure at an outlet 228 of integrated ejector valve assembly 106 greater than a first predetermined range of pressure and second valve assembly 208 is configured to maintain a pressure at the outlet of integrated ejector valve assembly 106 greater than a second predetermined range of pressure, wherein the first range of pressure is greater than the second range of pressure, and wherein the first and second ranges do not overlap. A longitudinal axis 227 extends through integrated ejector valve assembly 106 from inlet 202 to outlet 228 and in various embodiments through a mixing chamber 229 in flow communication with outlet 228.

During operation, integrated ejector valve assembly 106 can control the downstream bleed air pressure under all operating conditions, using LP bleed air exclusively when LP pressure is sufficient and augmenting with HP flow when LP pressure is insufficient.

The elements of integrated ejector valve assembly 106 are controlled by controller 124. In the exemplary embodiment, controller 124 is an electronic controller. In an alternative embodiment, controller 124 is a pneumatic controller configured to control the valve elements with pneumatic signals. Pressure to actuate first valve assembly 200 and second valve assembly 208 is channeled from HP bleed port 120 (shown in FIG. 1) and is ported to the various chambers by torque motor servo valve 223 controlled by controller 124. With this control flexibility, first integrated ejector valve assembly 106 and second integrated ejector valve assembly 108 can be used as flow control valves, pressure regulating valves, or as shut-off valves with no hardware changes. The ejector valve can also be used to equalize flow between the engines of multiple engine aircraft.

In the exemplary embodiment, integrated ejector valve assemblies 106 and 108 are described as flow control valves using flow signals from downstream flow meters 128 and 130 channeled to controller 124 that controls the position of the valve elements, for example, but not limited to, pintle and poppet valves positioned within integrated ejector valve assemblies 106 and 108.

As described above if bleed air pressure is assumed to be maintained between 30 and 40 psig. A pressure range setting of, for example, 32±2 psig may be selected for HP operation and a pressure range setting of, for example, 38±2 psig may be selected for LP operation. Whenever bleed system pressure is above the HP setpoint, the HP pintle valve will be fully closed. Whenever the pressure is below the LP setpoint, the LP poppet valve will be fully open. Whenever the pressure is above the LP setpoint the poppet valve will be fully closed to prevent backflow from HP bleed port 120 or 122 to LP bleed port 110 or 112, respectively.

Consider first the operation of one side as HP and LP pressure regulators. At rest, a first spring 230 keeps first valve assembly 200 closed. Second valve assembly 208 is held closed by a second spring 232 having sufficient force to keep the unpowered second valve assembly 208 closed at maximum downstream duct pressure to prevent backflow and assure shut-off. The unpowered torque motor servo valve 223 directs HP bleed air to chambers 216 and 218, keeping first valve assembly 200 and second valve assembly 208 closed during engine start.

When the engine is running and the bleed air system is actuated, both the LP and HP flow control circuits are actuated initially when the bleed air system pressure is low. HP air aspirates LP air via ejector 222.

As bleed air pressure rises above 32 psi, second valve assembly 208 slowly closes. If pressure continues to rise, indicating that there is sufficient pressure from the LP duct to supply the bleed air needs, second valve assembly 208 will close fully and the system will be supplied only from LP air regulating at 38 psi. A large demand, such as actuation of the wing anti-ice system, causes system pressure to drop. If there is insufficient LP bleed capability to maintain 38 psi at this higher flow then the pressure will continue to fall until it drops into the HP pintle valve operating range. The pintle valve slowly opens, aspirating LP air to mix with the HP air. The pintle valve continues to open until the pressure reaches 32 psi.

If LP pressure falls so low that aspiration ceases, there will be no flow from LP bleed port 110 and no flow forces maintaining first valve member 206 open, so first valve member 206 will close, acting as a check valve to prevent backflow.

When LP pressure rises above 32 psi, the ΔP across first valve member 206 will cause first valve member 206 to open, restoring flow from LP bleed port 110. This flow may cause the pressure to rise above the HP setpoint of 32 psi in which case second valve assembly 208 will close, or it may maintain an intermediate position to supply part of the total flow, assisted by ejector 222.

During operation using a two engine aircraft, where each engine is equipped with an integrated ejector valve assembly 106 or 108 operating independently to maintain a common downstream bleed system pressure, controller 124 also acts to balance the left and right engine flows.

As before, second valve assemblies 208 attempt to maintain 32 psi at an outlet of their respective integrated ejector valve assemblies 106 or 108 and first valve assemblies 200 attempt to maintain 38 psi at the outlet of their respective integrated ejector valve assemblies 106 or 108. At the same time, controller 124 monitors the flow through each circuit 105 and 107. If the flow through one circuit is greater than the flow through the other circuit, controller 124 transmits a signal to bias the associated first valve assembly 200 and second valve assembly 208 more closed. This bias signal is gradually increased until the left and right engine flows are approximately equal. This flow balancing is intended to respond slower than the pressure control function but is persistent and continuous so that after pressure transients, the flows are again rebalanced.

A single bleed system pressure signal is used by controller 124 to control all pressure and flow regulation functions. This signal may be an average of two or more pressure sensors or three sensors may vote to eliminate a failed sensor. A single composite signal is used so that any pressure drift affects both sides and all pressure equally.

To facilitate system pressure stability first valve assembly 200 acting as the LP pressure regulator is configured to respond relatively fast, second valve assembly 208 acting as the HP pressure regulator is configured to respond slower, and the flow balancing bias is configured to respond slowest.

Figure 3:
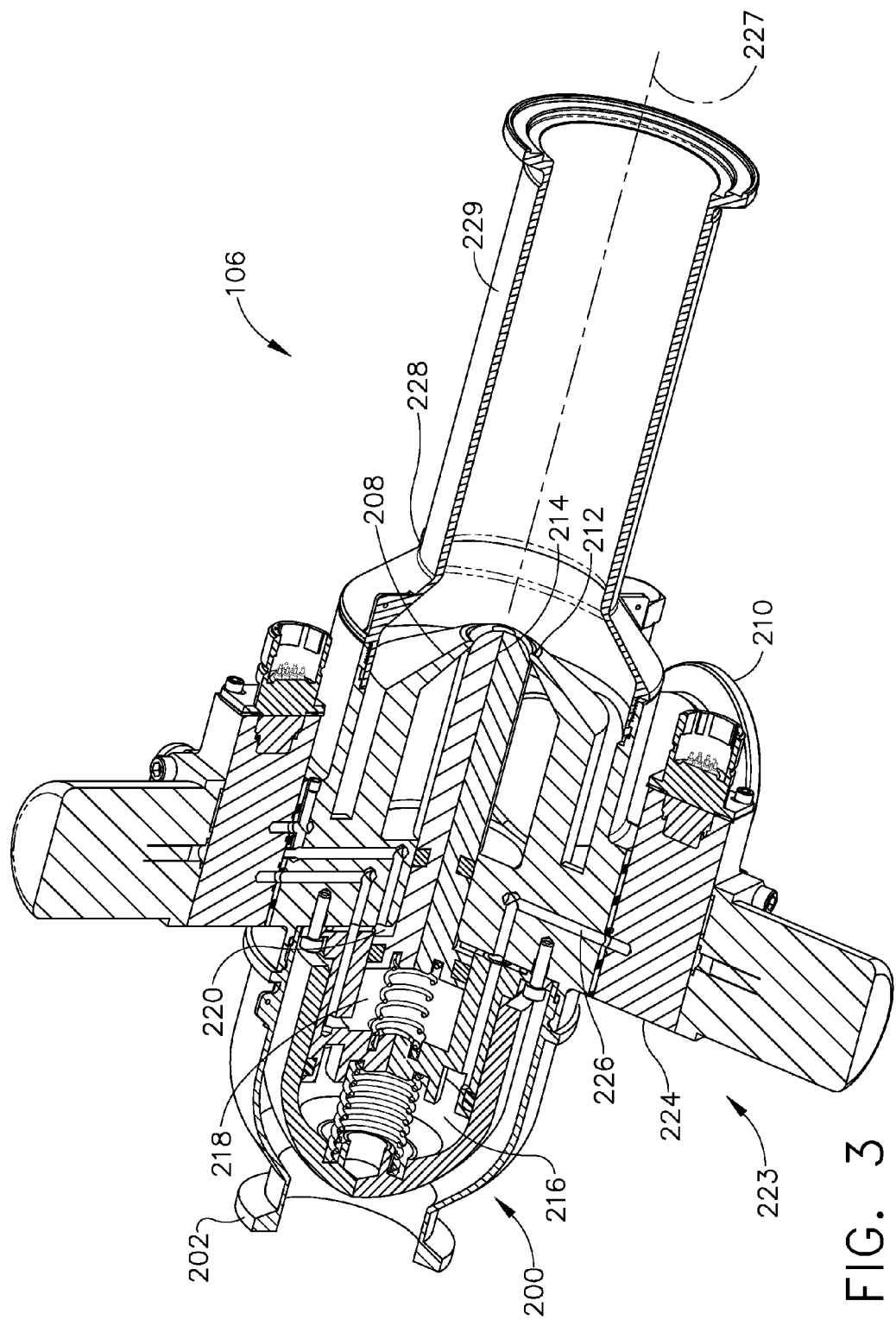

FIG. 3 is an isometric cross section of integrated ejector valve assembly 106 (shown in FIG. 1) in accordance with an exemplary embodiment of the present invention. Alternative embodiments of the present invention include positioning a check valve upstream of second valve assembly 208 and removing poppet return spring 230. In various embodiments, the poppet end or pintle end may have a conical cross-section, a spherical cross-section, or a contoured cross-section. One or both valve elements can be actuated with pneumatic pressure directly from a pneumatic reference regulator, avoiding the need for an electronic controller. The bleed air control functions accomplished in a single integrated ejector valve assembly include shut-off of HP and LP bleed air, LP check valve to prevent backflow of HP air, bleed air pressure regulation in both HP and LP bleed extraction modes, flow balancing between left and right engines, preferential use of LP bleed air whenever sufficient LP bleed pressure is available, and aspiration of LP air with HP air via an ejector to extract LP bleed air when the LP pressure is marginal.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 126, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is controlling a bias of the integrated ejector valve assembly based on an output flow to match the flows using LP bleed air and if needed HP bleed air. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of supplying bleed air using a single housing integrated low pressure (LP) and high pressure (HP) integrated ejector valve assembly provides a cost-effective and reliable means for supplying bleed air to an aircraft. The integrated ejector valve assembly incorporates an LP regulator assembly, HP regulator assembly, ejector, and shut-off valve members in a single housing providing a simpler assembly having fewer parts and reduced weight. Simplicity provides both higher reliability and lower manufacturing cost. Low weight is always on advantage on aircraft equipment. As a result, the methods and systems described herein facilitate operation and maintenance activities associated with aircraft in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of supplying engine bleed air to an aircraft using a first integrated ejector valve assembly, said method comprising:
controlling a flow of a relatively lower pressure fluid received at the first integrated ejector valve assembly using a first valve assembly;
controlling a flow of a relatively higher pressure fluid received at the first integrated ejector valve assembly using a second valve assembly;
maintaining a pressure in an outlet of the first integrated ejector valve assembly using the controlled flow of relatively lower pressure fluid and the controlled flow of relatively higher pressure fluid;
biasing at least one of the first valve assembly and the second valve assembly based on the outlet flow from the first integrated ejector valve assembly; and
supplying a portion of the engine bleed air to an aircraft using a second integrated ejector valve assembly.

2. A method in accordance with claim 1, further comprising receiving at least one of the flow of the relatively lower pressure fluid and the flow of the relatively higher pressure fluid from a bleed port on a gas turbine engine.

3. A method in accordance with claim 1, wherein controlling a flow of a relatively lower pressure fluid further comprises aspirating the flow of relatively lower pressure fluid through an ejector positioned within the first integrated ejector valve assembly using the flow of relatively higher pressure fluid.

4. A method in accordance with claim 1, further comprising coupling an outlet of a second integrated ejector valve assembly to an outlet of the first integrated ejector valve assembly.

5. A method in accordance with claim 1, wherein supplying engine bleed air to an aircraft comprises:
supplying engine bleed air to an aircraft using the first integrated ejector valve assembly to supply a first portion of the engine bleed air and a second integrated ejector valve assembly to supply a second portion of the engine bleed air;
measuring the flow of the first portion and the flow of the second portion; and
adjusting the flow of at least one of the first portion and the second portion such that the flow of the first portion and the second portion are substantially equal.

6. An aircraft system comprising:
a first gas turbine engine comprising a first high pressure bleed port and a first low pressure bleed port;
a second gas turbine engine comprising a second high pressure bleed port and a second low pressure bleed port;
an engine bleed air header configured to channel bleed air at a selectable pressure to the aircraft;
a first integrated ejector valve assembly coupled in flow communication between said first high pressure bleed port and first low pressure bleed port, and said engine bleed air header;
a second integrated ejector valve assembly coupled in flow communication between said second high pressure bleed port and second low pressure bleed port, and said engine bleed air header; and
a controller communicatively coupled to said first integrated ejector valve assembly and said second integrated ejector valve assembly, said controller configured to substantially match an output flow of said first integrated ejector valve assembly and said second integrated ejector valve assembly.

7. A system in accordance with claim 6 wherein at least one of said first integrated ejector valve assembly and said second integrated ejector valve assembly includes a first valve assembly configured to maintain a pressure at said engine bleed air header greater than a first predetermined range of pressure and a second valve assembly configured to maintain the pressure at said engine bleed air header greater than a second predetermined range of pressure, wherein the first range of pressure is greater than the second range of pressure, and wherein the first and second ranges do not overlap.

8. A system in accordance with claim 6 wherein at least one of said first integrated ejector valve assembly and said second integrated ejector valve assembly includes a bias assembly configured to receive a bias command from said controller, the at least one of said first integrated ejector valve assembly and said second integrated ejector valve assembly configured to adjust the output flow of a respective one of at least one of said first integrated ejector valve assembly and said second integrated ejector valve assembly using the bias command.

9. A system in accordance with claim 6 wherein at least one of said first integrated ejector valve assembly and said second integrated ejector valve assembly includes a bias assembly configured to receive a bias command from said controller, the at least one of said first integrated ejector valve assembly and said second integrated ejector valve assembly configured to adjust the output flow of a respective one of at least one of said first integrated ejector valve assembly and said second integrated ejector valve assembly using at least one of an associated first valve assembly and a second valve assembly positioned within said integrated ejector valve assembly.

10. A system in accordance with claim 9 wherein said bias assembly comprises a bias member configured to bias said first valve assembly and said second valve assembly to a closed position.

11. A system in accordance with claim 6 wherein said bias assembly comprises at least one of an electrical and a pneumatic positioning assembly.

* * * * *